United States Patent [19]

Clare et al.

[11] 4,216,917
[45] Aug. 12, 1980

[54] SAFETY INTERLOCK FOR THE FOOD PUSHER IN A FOOD PROCESSOR

[75] Inventors: Richard D. Clare; Carl G. Sontheimer, both of Greenwich, Conn.

[73] Assignee: Cuisinarts, Inc., Greenwich, Conn.

[21] Appl. No.: 959,937

[22] Filed: Nov. 13, 1978

[51] Int. Cl.² ............................................. B02C 18/16
[52] U.S. Cl. ..................................... 241/37.5; 241/92; 241/282.1
[58] Field of Search ..................... 241/37.5, 92, 282.1, 241/282.2, 36, 199.12

[56] References Cited

U.S. PATENT DOCUMENTS

| | | | |
|---|---|---|---|
| 3,892,365 | 7/1975 | Verdun | 241/282.1 X |
| 4,081,144 | 3/1978 | Bouillet | 241/37.5 |
| 4,117,980 | 10/1978 | Hartmann | 241/37.5 |

Primary Examiner—Mark Rosenbaum
Attorney, Agent, or Firm—Parmelee, Johnson, Bollinger & Bramblett

[57] ABSTRACT

An improvement in a food processor of the type having a housing enclosing a motor, a drive shaft extending from the housing, a working bowl which is detachably mountable on the housing in position to surround the shaft for receiving the various rotatable food processing tools which are removably installed on the shaft, with a removable cover on the bowl. Food processors of this type normally include a hopper or feed tube which is carried by the cover, and a manually operated pusher or plunger which is used to feed food items down through the hopper onto the rotating cutter blade, slicing disc, rasping tool, etc. The improvement comprises a safety interlock between a switch actuator associated with the cover and an on-off switch in the housing to permit actuation of the relatively powerful motor drive when the pusher is being properly inserted within the hopper, thereby preventing a user from inserting a hand down into the hopper where there is risk of inadvertently encountering injury from a rotating tool in the upper portion of the bowl. By virtue of this interlock, the feed tube can safely be made to have a larger cross-sectional area so that larger food items can be inserted whole into the food processor. Moreover, the entire size of the working bowl, cover and feed tube can be proportionately enlarged for providing a larger overall machine.

30 Claims, 17 Drawing Figures

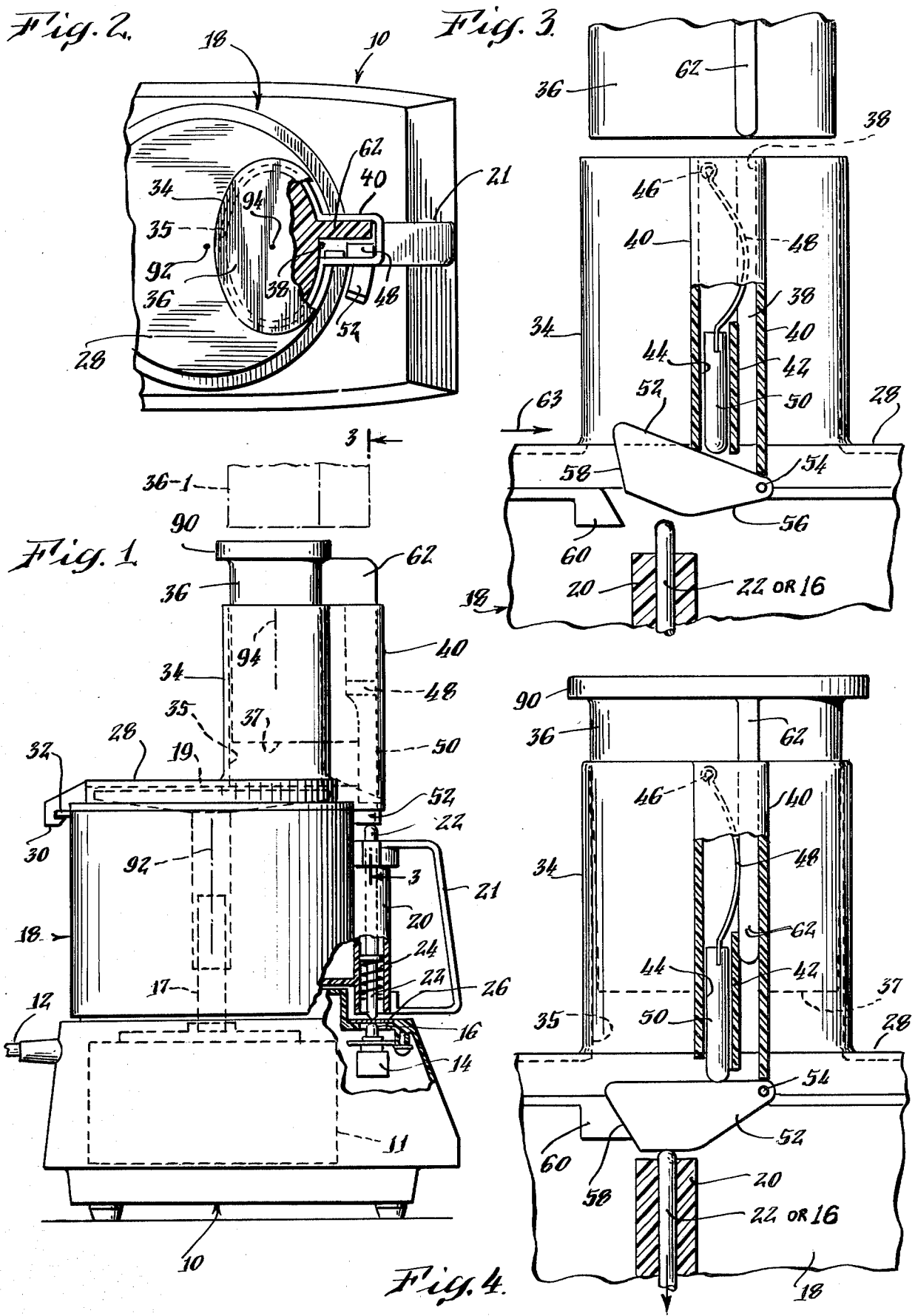

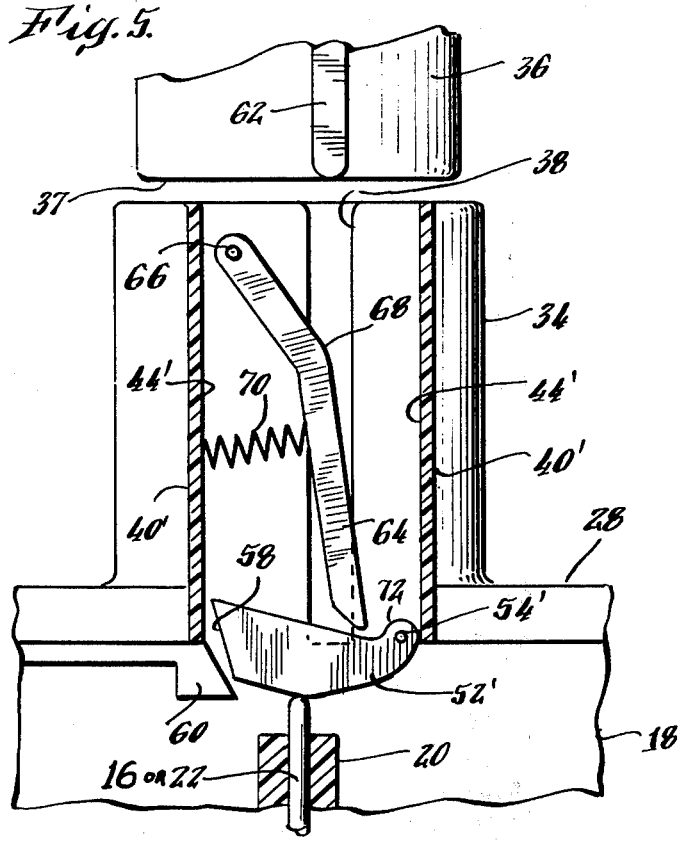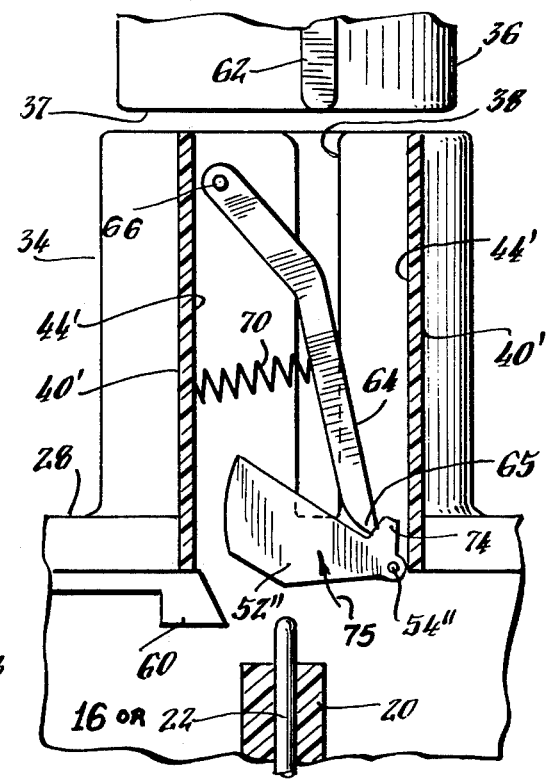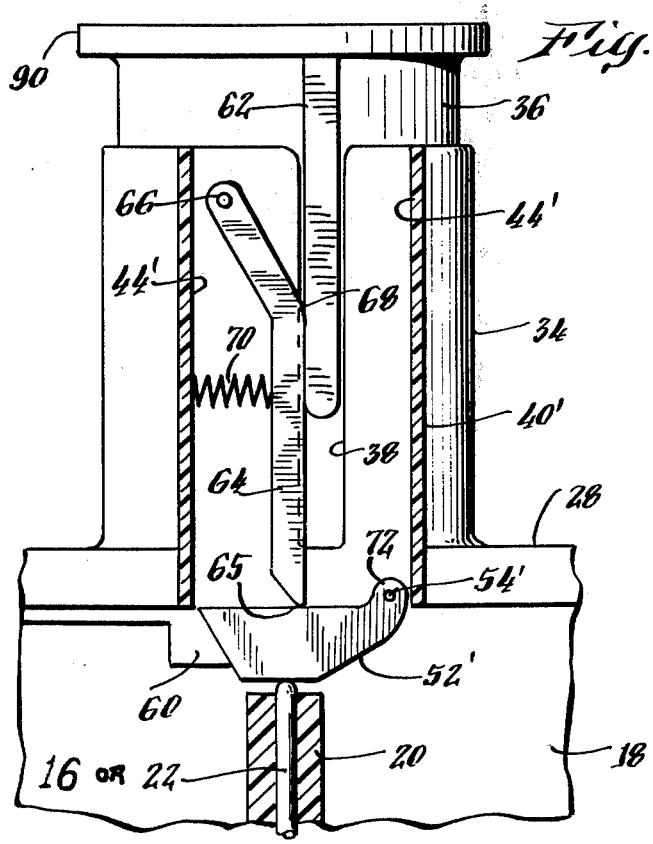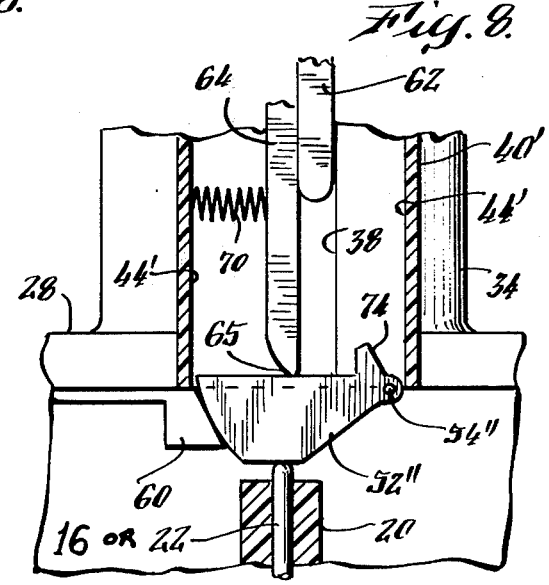

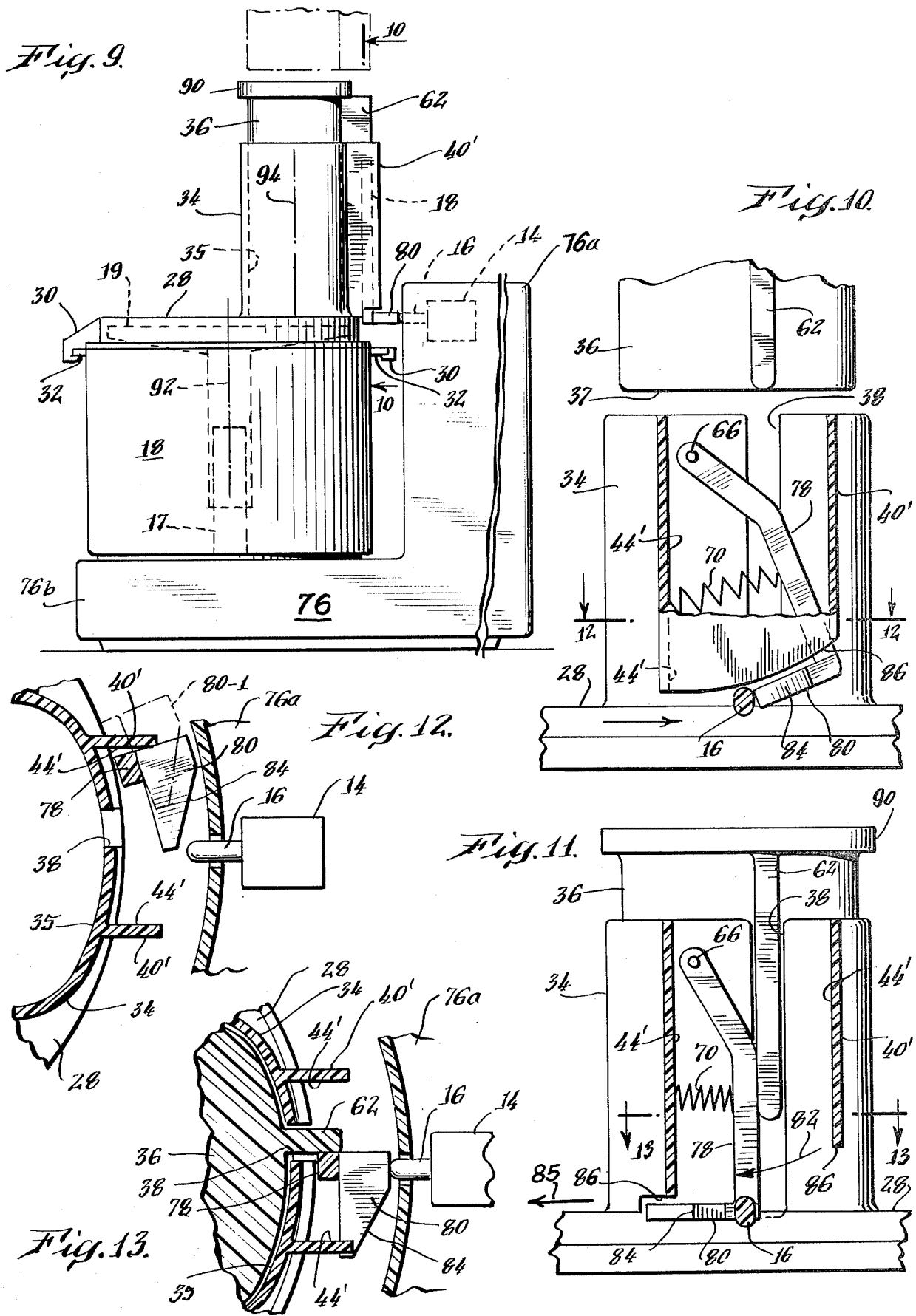

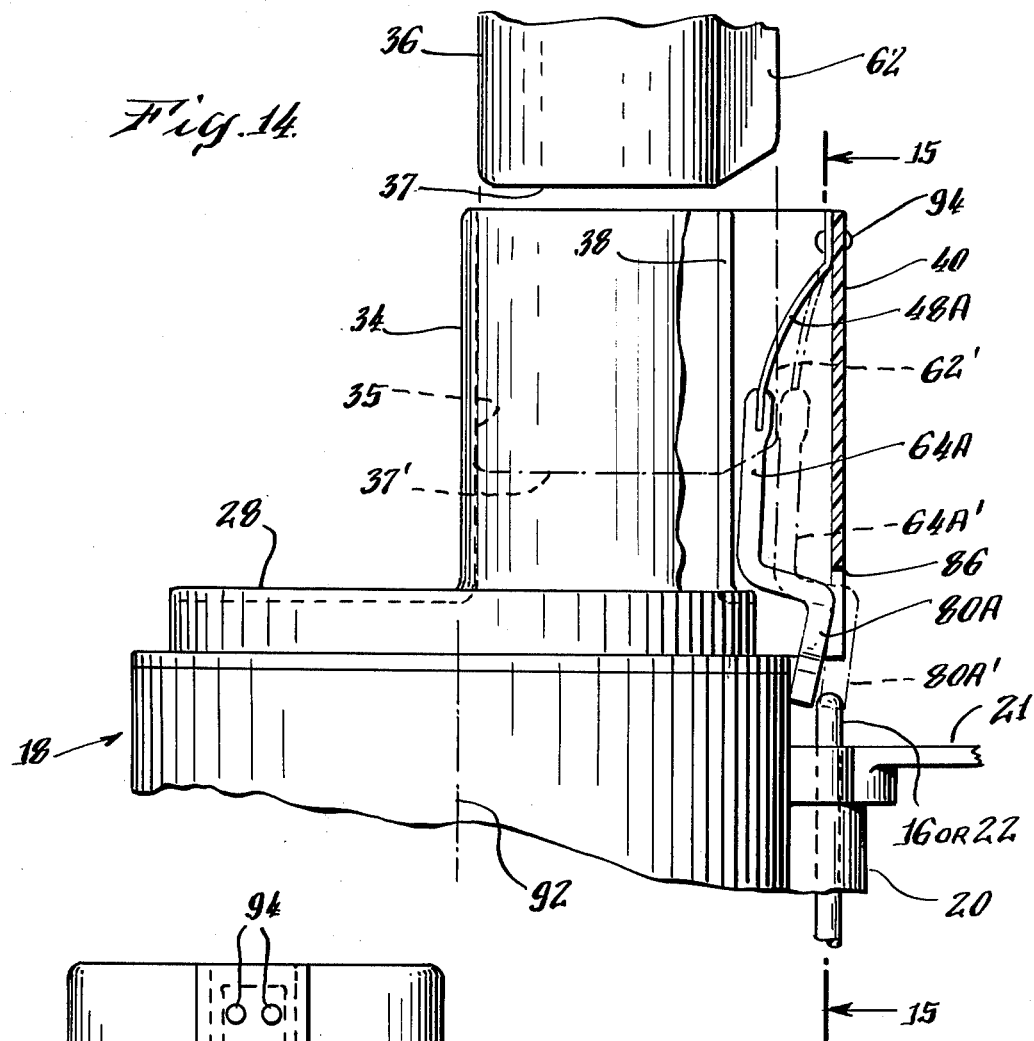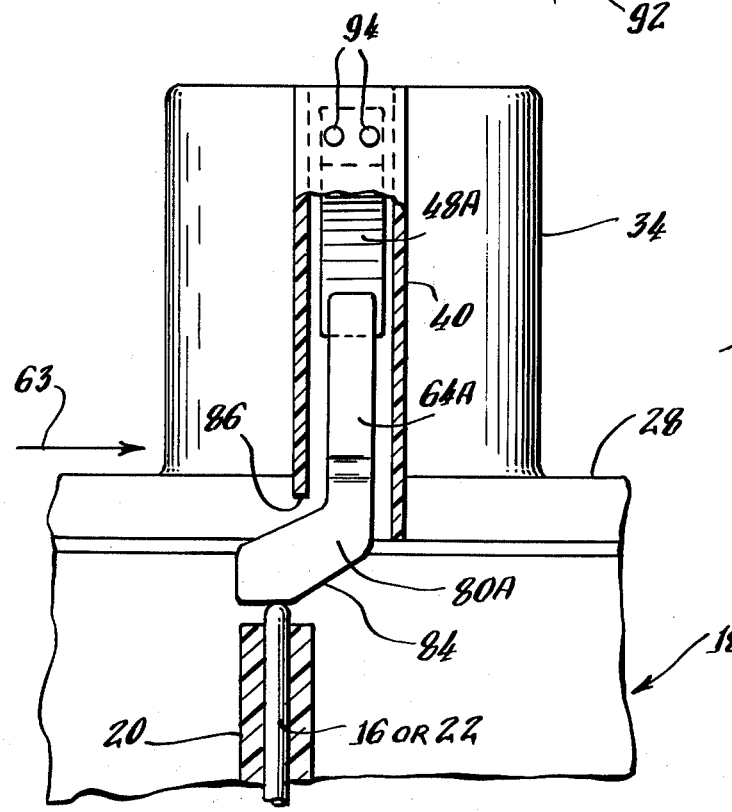

SAFETY INTERLOCK FOR THE FOOD PUSHER IN A FOOD PROCESSOR

FIELD OF THE INVENTION

The present invention relates to apparatus for preparing food and, in particular, to the multipurpose kitchen apparatus called food processors in which a plurality of interchangeable rotary food preparing tools are removably mounted on a drive shaft, including a variety of tools such as cutting discs or blades, slicing discs, rasping discs, grating discs, grinding or chopping blades, etc., which are used for performing the operations of cutting, slicing, rasping, grating, or pureeing, of food items.

BACKGROUND OF THE INVENTION

There are food processors of the type broadly set forth above having a working bowl or vessel with a motor driven shaft projecting vertically upwards through the bottom of the bowl on which various selected rotary tools can be engaged to be driven by the shaft for performing various food processing operations as may be desired by the user. A detachable cover is secured over the top of the bowl during use. This cover includes a hopper or feed tube which has a mouth that opens downwardly through the cover into the top of the bowl. The food items to be prepared are placed in this feed tube and then are manually pushed down through the feed tube into the bowl by means of a removable pusher member which is adapted to slide down in the manner of a plunger into this feed tube. For further information about this type of food preparing apparatus, the reader may refer to U.S. Pat. Nos. 3,892,365—Verdun and 3,985,304—Sontheimer.

The rotary tools in food processors are being driven by relatively powerful motor drive arrangements and have the capability of causing serious injury. For this reason, a bowl-cover safety feature is conventionally incorporated into these units. This feature requires that the cover be firmly locked onto the bowl in normal position before the motor will start. This requirement is achieved by making the cover, which locks rotationally to the bowl, with a projection or member which causes the closing of a switch carried in the housing only when the cover is properly locked into its normal position on the bowl. Depending upon the type of food processor, this cover projection may actuate the switch directly or through an intermediate linkage.

Another safety feature is the provision of an upright food-receiving hopper having a feed passageway which extends down through the cover. This hopper is deliberately designed in terms of shape, moderate cross-sectional area of the food feed passageway and height to make it almost impossible for a normal adult inadvertently to insert a hand sufficiently far down into the hopper to touch the rotating tool located in the upper portion of the working bowl. In addition, the pusher is provided for feeding food items down into engagement with the food processing tool.

Other objects, features, and advantages of this invention will become apparent from a consideration of the following description in conjunction with the drawings and from the appended claims.

SUMMARY OF THE INVENTION

The invention is an improvement in an automatic food processor of the type including a power source within a housing having a drive shaft and with a power-on switch in the housing. A working bowl is mountable on the housing enclosing the drive shaft, which is adapted to have a rotatable tool removably installed on it. A removable cover for the bowl has a power switch actuator thereon and a food receiving hopper having a passageway which extends down through the cover. A food pusher is manually insertable into the hopper for advancing food against a food processing tool which may be located in the upper portion of the working bowl. The improvement comprises a safety interlock means which is operatively associated with the power switch actuator and the power-on switch for actuating the switch only when the pusher is being inserted in the hopper, thereby excluding entry of a hand.

Among the advantages of this interlock are those resulting from the fact that the cross-sectional area of the food passageway in the feed tube can be made as large as may be desired, so that larger food items can be inserted whole into the food processor. As a result, the entire machine can now safely be scaled up to larger size for commercial and industrial applications, with corresponding enlargement of the cover and feed tube.

BRIEF DESCRIPTION OF THE DRAWINGS

FIG. 1 is a side view of a food processor incorporating the invention, a portion thereof being broken away to illustrate its internal construction;

FIG. 2 is a partial top view of the processor of FIG. 1 partially broken away to illustrate the structure;

FIG. 3 is an enlarged, partial right side view of the processor of FIG. 1, as seen from the position 3—3 with the food pusher removed from the hopper and with the structure shown partially in section;

FIG. 4 is a view similar to FIG. 3 showing the operation of the safety interlock mechanism;

FIG. 5 is a view similar to FIG. 3 illustrating a modified form of safety interlock;

FIG. 6 is a view similar to FIG. 3 illustrating the operation of the safety interlock of FIG. 5;

FIG. 7 is a view similar to FIG. 5 illustrating a further modification of the interlock of FIG. 5;

FIG. 8 is a partial view similar to FIG. 6 illustrating the operation of the interlock of FIG. 7;

FIG. 9 is an elevational view similar to FIG. 1, but illustrating the invention as embodied in a food processor having a different type of housing;

FIG. 10 is an enlarged, right side view of the hopper portion of FIG. 9, as seen from the position 10—10 with the food pusher removed from the hopper and with the structure shown partially in section to illustrate the safety interlock mechanism;

FIG. 11 is a view similar to FIG. 10 illustrating the operation of this interlock;

FIG. 12 is a cross section taken substantially along the line 2—2 of FIG. 10 showing the cooperative interaction between the safety interlock and the power-on switch;

FIG. 13 is a cross section taken substantially along the line 13—13 of FIG. 11 showing actuation of the power-on switch;

FIG. 14 is a side view of the upper portion of a food processor, partially shown in section, illustrating a modified embodiment of the invention;

FIG. 15 is a right side view of the apparatus of FIG. 14 as seen from the position 15—15;

DESCRIPTION OF THE PREFERRED EMBODIMENTS

Figure 16:
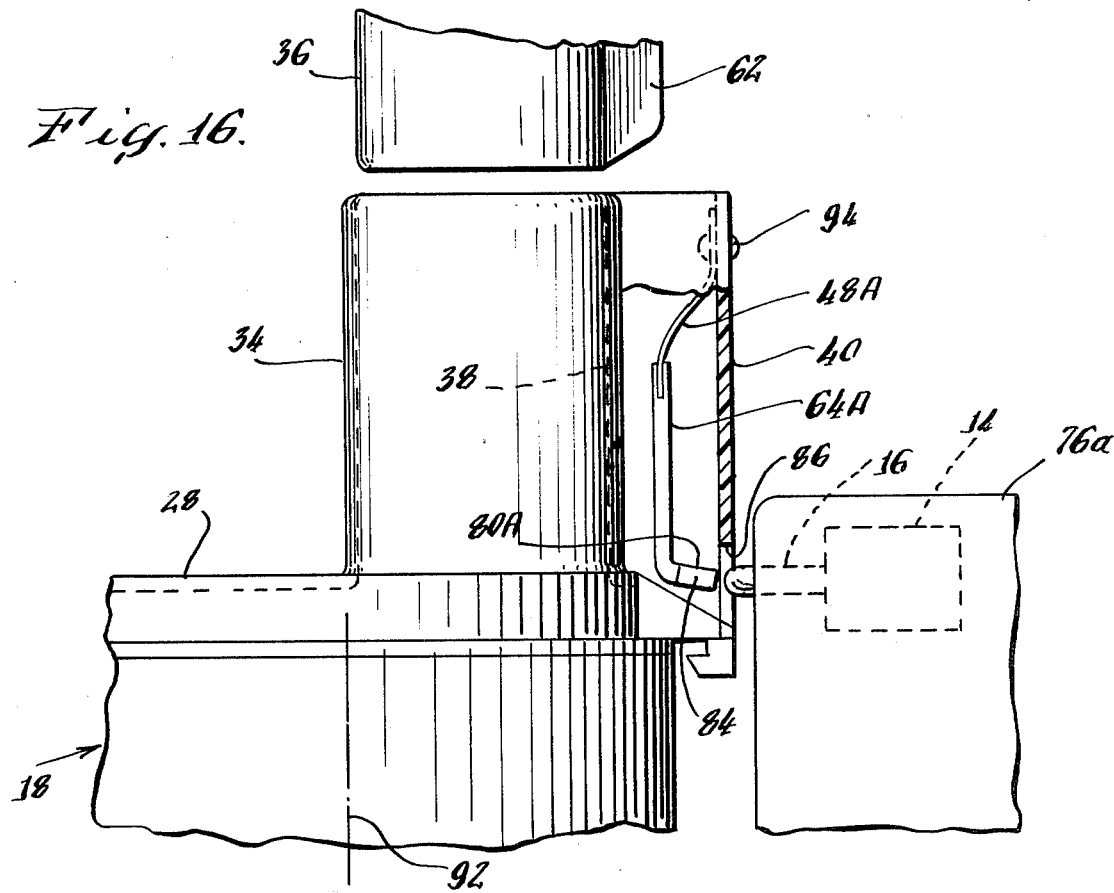
FIG. 16 is a side view of the top portion of a food processor, partially shown in section, illustrating a further modified embodiment of the invention.

With particular reference to FIGS. 1 and 2, there is illustrated a food processor of the type comprising a base housing 10 containing a power source in the form of a relatively powerful electric motor 11 which is energized by a power cord 12 via a switch 14 having a vertically reciprocable actuating button 16. As more fully shown in Verdun U.S. Pat. No. 3,892,365, a vertical drive shaft 17 extends upwardly from the base housing. A work bowl or vessel 18 is mountable on the housing 10 surrounding the drive shaft. A plurality of food processing tools such as the one shown at 19 are provided which may be selectively mounted on the drive shaft 17 for rotation within the bowl.

Formed on the side of the bowl 18 is a vertical semicylindrical boss 20 defining a guideway within which is carried a vertically movable operating rod 22 which is normally urged upwardly by means of a spring 24. When the bowl 18 is properly positioned upon the housing 10, the operating rod 22 is aligned with the actuating button 16 of the switch 14, being separated therefrom by means of a flexible, fluid-tight membrane 26.

The top of bowl 18 is closed by a cover 28 which is arranged to be engaged in locked relationship in its normal position on the bowl 18 whenever the food processor is in operation. For example, the cover may be held in locked engagement with the bowl by placing the cover onto the rim of the bowl and then giving the cover a partial turn to obtain a twist-lock effect. For this locking engagement the cover may for example, carry a plurality of circumferentially located depending lugs 30 which, upon rotation of the cover 28, engage beneath cooperating radial ledges 32 on the bowl 18 near its rim. The cover may be secured in place by clamping means or by any other manually engageable means. It is to be understood that there are numerous ways and means by which such a cover 28 may be held in locked engagement upon the working bowl 18 during operation of the food processor, and accordingly the term "means for holding the cover in its normal position on the bowl during operation of the food processor" is to be interpreted broadly.

Extending upwardly from the cover 28 is a food receiving hopper of feed tube 34 defining a passageway 35 which extends downwardly through the cover 28. In cross section the hopper 34 is substantially oval, as shown in FIG. 2, and is designed to receive a food pusher 36 which is manually insertable and employed to push food items down into engagement with the rotating tool 19. In use, the food items to be processed are manually placed into the hopper passageway 35, and the pusher 36 is inserted into this passageway so that the lower end 37 of the pusher presses down onto the food items.

The apparatus thus far described is conventional and illustrated in the referenced Verdun patent. In prior art food processors, moreover, the cover 28 includes a camming surface which engages and forces down the operating rod 22 when the cover is held in its normal position on the bowl 18. The rod 22 in turn forces down the actuating button 16 of the switch 14, which thereby starts the motor 11 in operation. This actuation of the electrical switch 14 by means of the correct positioning of the cover 28 is intended as a safety feature, for the tool 19 can begin to rotate only when the cover 28 is tightly in place.

It will be noted that the unit is thereby caused to operate even though the hopper 34 might be open. A person with a very small hand could thereby become injured by inadvertently reaching down through a passageway 35 in the hopper or by using a foreign object, for example, such as a fork or spoon to push food items down through the food passageway 35. Accordingly, the present invention provides a safety interlock which prevents operation of the tool whenever the pusher 36 is absent from the passageway 35 in the hopper 34.

One embodiment of the invention is illustrated in FIGS. 1-4. In this embodiment, the side of the hopper 34 defines a vertical slot 38 enclosed by an elongated boss 40 of rounded rectangular cross section which is open at its top and bottom. An inner wall or vertical partition 42 within the boss 40 and adjacent to the slot 38 forms a vertical guideway 44 within the boss enclosure 40. Supported within this boss 40 near its upper end for example as by a pin 46 is a curved leaf spring 48 which is normally bowed, as shown in FIG. 3, to extend at least partially across the slot 38. Connected to the lower end of the leaf spring 48 is a push rod 50 which is axially movably retained within the guideway 44.

In conventional food processors—as shown, for example, in the referenced Verdun patent—the cover carries a fixed cam which normally depresses the actuating rod 22 carried by the bowl. In the safety interlock embodiment of the invention as herein described, however, the fixed cam is replaced by a pivoted cam member 52 (FIGS. 3 and 4) mounted on a pivot pin 54 to underlie the push rod 50. This pivoted member 52 is shaped along its lower surface, as viewed in FIGS. 3 and 4, to provide a camming surface 56, and its free end 58 is shaped to engage a limit stop 60 for restricting its downward movement. An aspect of the safety interlock apparatus as shown is the fact that the pusher 36 is specially shaped. It is formed with a vertical rib or protruding member 62 along one side in a position to be advanced downwardly within slot 38 when the pusher 36 is inserted down into the food feed passageway 35 in hopper 34.

The operation of this interlock embodiment of the invention will now be explained with particular reference to FIGS. 3 and 4. In FIG. 3, the pusher 36 has not been inserted into the hopper 34. When the pusher 36 is absent from the food feed passageway 35, it is desired that the motor drive actuator rod 22 not become depressed in order that the switch 14 (FIG. 1) not be actuated. As a result of the relatively large bow in the leaf spring 48, the push rod 50 is suspended substantially above the cam member 52 when the latter is in its lowermost position with its free end 58 against limit stop 60. As the cover 28 is rotated into locking engagement with bowl 18, it moves relative to the rod 22 as shown by the arrow 63 in FIG. 3. The camming surface 56 of the loosely pivoted cam member 52 thus rides up over the end of rod 22 to the illustrated inactive cam position in FIG. 3. As the actuator rod 22 remains raised, the switch 14 remains open, and consequently the drive unit 11 remains deenergized.

If the pusher 36 is now inserted into hopper 34, as shown in FIGS. 2 and 4, its vertical rib 62 enters the slot 38 and, in being pushed down, this rib engages the leaf spring 48 forcing it (as shown in FIG. 4) into a more straightened position. This straightening of the spring concurrently lowers or extends the push rod 50 which thereupon depresses the cam member 52, into its active position forcing actuator rod 22 down to close switch 14, energizing the motor drive 11.

It will thus be apparent that the food processor will remain inoperative until the pusher 36 is being inserted into the hopper 34 thereby preventing entry of a small hand or foreign object into the passageway 35.

Alternatively, the pusher 36 may be inserted into the hopper prior to latching the cover in position on the bowl. Under these circumstances, the cam 52 will be held downwardly in its active position by the extended push rod 50 (FIG. 4), so that during rotation of the cover into the latching position, it will function in the manner of a fixed cam. It will also be understood that full withdrawal of the pusher 36 at any time from the hopper will release the spring 48, permitting it to retract the push rod 50, whereupon cam member 52 will return to the FIG. 3 position thus allowing the actuator rod 22 to be raised by its spring 24, thereby deactivating the food processor.

It is to be understood that in FIGS. 3 and 4, the motor drive actuator rod 22 may be replaced by a switch button of a switch mounted in an upright support portion of the housing located near the outside of the bowl 18. Thus, the reference number 16 is also applied to this movable member 16 or 22, which becomes actuated only when the cover 28 is in proper position on the bowl and only when the food pusher is being properly inserted into the food feed passageway 35. Similar comments also apply to the actuator 16 or 22 shown in FIGS. 5-8 to be described.

FIGS. 5 and 6 illustrate an interlock which is a modification of the interlock shown in FIGS. 1-4. The bowl 18 and pusher 36 are identical to those described before, and, accordingly, the elements associated therewith are given the same respective reference numbers. The guideway 44' however, may be enlarged so as to occupy the entire interior of the elongated boss 40' which may be wider than the boss 40 in FIGS. 2-4. This guideway 44' contains an arm 64 pivoted at its upper end by pivot pin 66. The arm 64 is shaped to define an elbow 68 which extends into the slot 38 and is held in such position by means of a spring 70 which seats against one wall of the boss 40'. Mounted closely below the end of the arm 64 is a pivoted cam member 52' which is quite similar to cam member 52 except that it has a raised pivot 54' located within a projecting end 72 on the cam member 52'. With the pusher withdrawn, the various members assume the positions shown in FIG. 5, wherein loosely pivoted cam member 52' rides upon the upper end of the actuator rod 16 or 22, into an inactive position, allowing the drive to remain inoperative.

Upon insertion of push member 36, as shown in FIG. 6, the rib 62 entering slot 38 forces the arm 64 to swing to the left in clockwise rotation thereby moving its lower end 65 into abutting relationship with the top of the pivoted cam member 52'. The lower end 65 of the arm 64 in turn forces down cam member 52' into an active position and depresses the actuator 16 or 22 to thereby render the motor drive operative. The purpose of the elbow 68 is to raise the point of engagement with the rib 62, so that a modest amount of insertion of the pusher 36 into the hopper passageway 35 is sufficient to activate the food processor.

FIGS. 7 and 8 illustrate a third safety interlock modification which is very similar to that shown in FIGS. 5 and 6. The pivoted cam member 52", however, more closely resembles cam 52 of FIGS. 3 and 4. The primary distinction is the addition of a raised finger 74. This finger is engaged by the end 65 of the arm 64 when the pusher 36 is withdrawn as shown in FIG. 7. This engagement of the end 65 against finger 74 rotates the cam 52" clockwise as shown by arrow 75 into an inactive raised position as illustrated in FIG. 7. Otherwise, as shown in FIG. 8, the operation of this third embodiment (FIGS. 7 and 8) of the safety interlock is the same as that of the embodiment of FIGS. 5 and 6. Namely, when the pusher has been inserted into the hopper, the rib 62 enters the slot 38, causing the lower end 65 of the arm 64 to abut against the top surface of the pivoted cam member 52" for depressing this cam member into an active position to cause depression of the actuator rod 22 or switch actuator button 16 as seen in FIG. 8 for energizing the motor drive 11.

FIGS. 9-13 illustrate another form of safety interlock embodying this invention adapted for use with a food processor of the type which may have a motor located in an upright portion of the housing standing upright adjacent to the working bowl 18 or may have a switch located in such an upright portion of the housing with the motor in the base portion. Such a food processor is characterized by a driving housing 76 which, as illustrated in FIG. 9, is L-shaped as seen in side elevation. The motor itself may be contained in the upstanding portion 76a of the housing which may also contain the on-off switch 14 with its actuating button 16 extending into a position where it can be actuated by a properly positioned cover. The switch 14 alone may be located in this upright portion 76a with the motor being located in the base portion 76b of the housing.

When the motor is in the upright portion 76a then the horizontal base portion 76b of the housing contains a mechanical drive connection extending from the motor to the drive shaft 17, as is known from food processors of this type which are currently commercially available in the United States. The drive shaft 17 extends up into the working bowl 18 for receiving a food processing tool 19, similar to the arrangement shown in FIG. 1. The bowl 18 is substantially the same as described before. The cover of prior art food processors of this L-shaped housing type includes a fixed cam for engaging the horizontally mounted switch button 16 located in the upstanding housing portion or pedestal 76a, so as to assure that the motor does not become energized until the cover is held in its normal position on the bowl 18.

Nevertheless, the same hazards exist in these prior art food processors of the L-shaped pedestal housing type (FIG. 9) as described before in connection with the other type of food processor. That is, the feed passageway 35 may be open when the tool in the bowl 18 is being rotated by the motor drive.

In the safety interlock apparatus as shown in FIGS. 9-13, the hopper 34 on the cover 28 has an elongated boss 40' defining a guideway 44' generally similar to that shown in FIGS. 5-8. There is a slot 38 in the hopper wall which provides communication from the feed passageway 35 into the guideway 44' within the boss 40'. Within the guideway 44' is located a pivoted arm 78 mounted on a pivot 66 and normally displaced by a spring 70, all substantially similar to the mounting of the arm 64, as shown in FIGS. 5-7.

However, instead of a separately mounted cam member, the lower end of the arm 78 carries a horizontally mounted cam 80. Insertion of the pusher 36 into the hopper 34 causes its rib 62 to enter the slot 38 so as to contact and to swing the arm 78 to the left as shown by the arrow 82 in FIG. 11, in the same fashion as described in connection with the embodiments of FIGS. 5-8. Instead of moving a separate cam member however, this movement of the arm 78 causes translation of the cam member 80 from an inactive position as shown in FIG. 10 (and as shown in dashed outline at 80-1 in FIG. 12) into an active position where the cam member 80 will effectively engage against the button 16, as shown in FIGS. 11 and 13, when the cover is turned in the direction 85 in FIG. 11.

The cam member 80 has a cam surface 84 which slopes outwardly in the horizontal plane as seen in FIGS. 12 and 13 for depressing the switch button 16 for closing the switch 14 to energize the motor drive. The lower end of the elongated boss 40' has a clearance opening, as shown at 86 in FIGS. 10 and 11. This opening 86 provides clearance to allow the cam member 80 to project horizontally out of the guideway 44', so that its cam surface 84 can actuate the switch button 16 when the cover 28 is in its normal operating position on the bowl 18 and when the pusher 36 has been inserted into the hopper 34.

Inviting attention to FIGS. 1, 2 and 14, it is to be understood that the working bowl or vessel 18 may have one or more handles 21 thereon, or such a handle may be entirely omitted as shown in FIG. 9 or 16.

In FIGS. 14 and 15, the cam actuator 80A has a cam surface 84 which slopes downwardly. This cam actuator 80A is mounted on a movable arm 64A which is attached to a leaf spring 48A secured within the interior of an enclosure 40 on the side of the hopper or feed tube 34. As shown, the top of this leaf spring is secured at 94 to the enclosure wall 40.

In its relaxed position, as shown in FIG. 14, the spring 48A retracts the actuator 84A inwardly in a radial direction into an inactive position, as shown by the solid line outline, so that the cam surface 84 will not engage the motor drive actuator 16 or 22 when the cover 28 is installed in its proper position on the work bowl 18.

When the pusher 36 is inserted into the food feed passageway 35, the rib 62 extending radially through the slot 38 in the wall of the feed tube 34, deflects the leaf spring 48A radially away from the centerline 92 of the work bowl. Thus, the cam surface 84 becomes repositioned outwardly into an active position so that it will depress the motor drive actuator 16 or 22 into operating condition as shown in FIG. 15 when the cover 28 is turned as indicated by arrow 63 into its proper closed position on the bowl 18.

The dashed outlines 64A' and 80A' in FIG. 14 show the arm and cam actuator after they have become displaced radially outwardly into their active motor drive operating positions by the insertion of the food pusher 36. The reference number 86 indicated a clearance opening in the enclosure wall 40 through which the cam actuator 80A can protrude.

Figure 17:
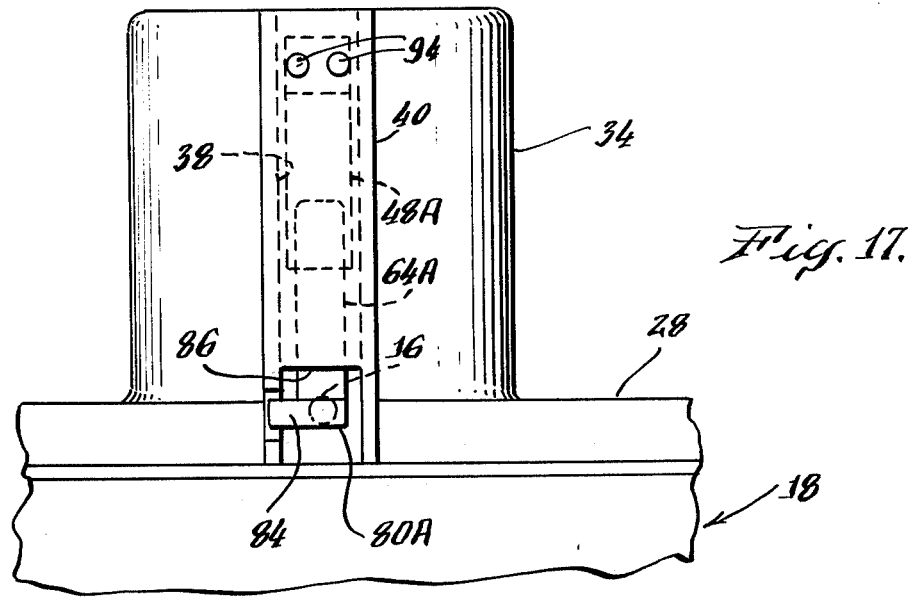
FIG. 17 is a right side view of the apparatus of FIG. 16 as seen from the position 17—17.

The modified embodiment of the invention shown in FIGS. 16 and 17 is similar to that shown in FIGS. 14 and 15, except that the cam actuator 80B has a cam surface which slopes radially outwardly with respect to the centerline 92 of the working bowl 18. When the food pusher 36 is absent from the food feed passageway in the hopper 34, the leaf spring 48A is relaxed and retracts the cam actuator 80B radially inwardly into an inactive position, as seen in FIG. 16. Thus, the cam surface 84 does not operate the motor drive actuator 16, shown as a push button for a switch 14, when the cover 28 is turned into its closed position.

Upon insertion of the pusher 36 into the food feed passageway, the spring 48A is deflected radially outwardly by the rib 62, so that the cam surface 84 protrudes out further through the clearance opening 86 into its active position. Consequently, when the cover 28 is turned into its closed position, as shown by arrow 85, the cam surface 84 engages and operates the motor drive actuator 16, for rendering the motor drive operative.

In the foregoing discussion of the advantages of embodying the present safety interlock invention in a food processor it was assumed that the feed passageway 35 in the hopper 34 was too small for an adult's hand to be inserted. However, that fact inherently limits the size of the food items which can be fed through the passageway 35 to be processed by the rotating tool in the bowl. By employing this invention, it is an advantage that the hopper 34 can safely be enlarged for admitting the passage of larger food items through it. For example, large blocks of cheese to be sliced or grated, large potatoes, whole tomatoes, large cucumbers or squash, or other large food items or whole vegetables or fruit, may thereby be accommodated for slicing or rasping them or for subjecting them to a julienne multi-slicing, or for whatever processing as the case may be. This possible enlargement of the food feed passageway 35 enables a food processor to be utilized for additional food preparation procedures beyond the many procedures already available with this versatile equipment.

Moreover, this invention opens up the possibilities of producing larger food processors for institutional and restaurant applications. In such institutional food processors the cover 28 and the hopper 34 (and its passageway 35) would be proportionately larger such that it would be possible for an adult user inadvertently to insert a hand, were it not for the incorporation of a safety interlock in accordance with this invention.

Other advantages of the illustrative embodiments of the invention are those resulting from the fact that the safety interlock improvement can readily be incorporated into existing food processors by replacing the cover and food pusher. In these illustrative embodiments of the invention there is no change needed to be made in the motor housing 10 (FIG. 1) or 76 (FIG. 9) nor in the bowl 18 (FIG. 1 or FIG. 9 or FIGS. 14-17).

Thus, advantageously the cover 28 and food pusher 36 including the projecting rib 62 can be sold as replacement components to persons who already own conventional food processors. It is to be noted that the pusher 36 includes stop means to prevent the pusher from being inserted too deeply into the hopper 34. This stop means is shown as an outwardly extending flange 90 or protruding rim on the upper end of the pusher. When the pusher has been fully inserted its flange or any other suitable form of stop 90, such as a rim, protrusion, bosses or the like, seats down upon the upper end of the hopper and then later serves as a handle for conveniently lifting the pusher out of the hopper.

As indicated in FIGS. 1, 2 and 9, the axis of rotation 92 of the tool 19 is concentrically located with respect to the center of the bowl and cover. In the illustrative embodiments with the hopper 34 as shown, the centerline 94 of the passageway 35 is approximately midway between the center point (at 92) of the cover and the periphery of the cover.

It is to be understood that the hopper 34 could be located at any desired position on the cover 28. Also, it is to be understood that the drive actuator 14 can be any suitable control means for rendering the motor drive inoperative, for example, such as a switch or clutch for disengaging the motor from the tool drive shaft 17 (FIG. 1). A switch 14 is the preferred arrangement because it completely de-energizes the motor drive and thereby saves electrical energy.

It is believed that the many advantages of this invention and the manner in which it fulfills the stated safety objectives will be understood by those skilled in the art. It will also be understood that a number of variations and modifications may be made in the illustrative embodiments of the invention without departing from its spirit and scope. Accordingly the foregoing description is to be construed as illustrative only, rather than limiting. This invention is limited only by the scope of the following claims.

We claim:

1. In a food processor of the type including an electric motor drive in a housing with tool mounting means driven by the motor drive and control means in the housing for rendering the motor drive inoperative unless said control means is actuated, a bowl mountable on said housing for enclosing a rotatable tool within said bowl and driveable by said mounting means, a removable cover for said bowl having actuation means thereon for actuating the motor drive only when the cover is properly positioned on the bowl, a food-receiving hopper on said cover and extending therethrough for feeding food items through the cover into the bowl and a food pusher manually insertable into said hopper for pushing the food items, the invention which comprises: safety interlock means operatively associated with said actuation means for actuating said control means only when said cover is properly positioned on said bowl and said pusher is inserted in said hopper for preventing the insertion of a hand or foreign object through the hopper into the bowl when the tool is being driven by the operative motor drive.

2. In a food processor, the safety interlock of claim 1, wherein said safety interlock means comprises: a member movably mounted on said cover for movement between an actuating condition and a second condition in which the motor drive is not rendered operative, and locking means carried by said food pusher for locking said member in said actuating condition only when said pusher is inserted in the hopper with the cover properly positioned on the bowl.

3. In a food processor, the safety interlock of claim 2, wherein said hopper defines an opening extending through its side wall, and said locking means comprises a projection on said pusher advanceable into said opening as said pusher is inserted into said hopper.

4. In a food processor, the safety interlock of claim 3, wherein said member is a movable arm, and said actuation means is a cam whose position is changed by movement of said arm.

5. In a food processor, the safety interlock of claim 4, wherein said movable arm is carried by one end of a leaf spring having its other end secured to said hopper with a bowed central portion extending into the path of said projection during insertion of said pusher into said hopper.

6. In a food processor, the safety interlock of claim 1, in which: said actuation means includes a cam, movable positioning means for moving said cam on said cover, said cam being movable between active and inactive positions, and said food pusher having a projection thereon engageable with said actuation means upon insertion of the pusher into said hopper for moving said cam into an active position, whereby the motor drive becomes operative only when the cover is properly positioned on said bowl and said food pusher has been inserted into said hopper.

7. In a food processor, the safety interlock of claim 6, in which: said movable positioning means for moving said cam on said cover includes a leaf spring which is normally bowed, said leaf spring having one end secured to said cover with the second end of said leaf spring controlling the position of said movable cam, and said projection on said food pusher being engageable with said bowed leaf spring upon insertion of the pusher into said hopper for deflecting said leaf spring for moving said cam into said active position.

8. In a food processor, the safety interlock of claim 7, in which: said cam is pivotally mounted on the cover for movement between said active and inactive positions, a cam actuator is secured to the second end of said leaf spring, constraining means on said cover constrains said cam actuator to move along a path toward or away from said pivoted cam, said bowed leaf spring in its relaxed condition retracting said cam actuator away from said pivoted cam for allowing said pivoted cam to remain in its inactive position, and said leaf spring upon being deflected by the insertion of the pusher into said hopper forcing said cam actuator into engagement with said pivoted cam for moving said pivoted cam into its active position.

9. In a food processor, the safety interlock of claim 1, in which said actuation means includes a movable arm having an end movable between first and second positions, a movable cam whose position is controlled by said movable arm, said cam being moved into an inactive position when said arm is in said first position and being moved into an active position when said arm is in said second position, said arm normally occupying said first position, and said hopper having means for enabling said food pusher upon insertion at least partially into the hopper, when the cover is properly positioned on the bowl, to move the lower end of said arm into said second position for moving said cam into its active position for rendering the motor drive operative, whereby the tool mounting means is rotated by the motor drive only when the cover is properly positioned on the bowl and the food pusher is at least partially inserted into the hopper.

10. In a food processor, the safety interlock as claimed in claim 9, in which spring means is associated with the hopper for normally resiliently maintaining said movable arm with its lower end in said first position.

11. In a food processor, the safety interlock as claimed in claim 9 or 10, in which: said movable cam is pivotally mounted on the cover for movement up into its inactive position and down into its active position, the end of said arm in its first position releases said cam for upward movement of said cam into its inactive position, and the end of said arm in its second position depresses said cam down and locks said cam in its active position.

12. In a food processor, the safety interlock as claimed in claim 11, wherein said cam carries a finger thereon engageable by the end of said pivoted arm when in its first position for swinging said cam up into its inactive position.

13. In a food processor, the safety interlock as claimed in claim 1, in which said actuation means includes an arm extending generally along near said hopper, one end of said arm being mounted to the hopper for permitting swinging movement of the other end of said arm between first and second positions, said arm normally resting in its first position, a motor drive actuator carried by said other end of said arm, said motor drive actuator being moved into an inactive position when said other end of the arm is in its first position and being moved into an active position when said arm is in its second position, said hopper having means for enabling the food pusher upon at least partial insertion thereof into said hopper to move said arm into its second position, whereby the motor drive can become operative only when the cover is properly positioned on the bowl and the food pusher is at least partially inserted into said hopper.

14. In a food processor of the type having a working bowl mounted on a housing with a drive shaft extending into the bowl for rotating a food processing tool installed on the shaft and wherein an electric motor is located in the housing for rotating the drive shaft when the motor is energized, with an on-off switch in the housing for controlling the energization of the motor, a cover, means for holding the cover in its normal position on the bowl during operation of the food processor, a hopper on the cover having a food feed passageway extending through the cover into the working bowl when the cover is in said normal position on the bowl, a food pusher which is insertable into the food passageway for pushing food items through said passageway, and with means for preventing energization of the motor unless the cover is held in its normal position on the bowl, the improvement which comprises: safety interlock means operatively associated with said hopper including means responsive to the presence of the pusher in said feed passageway in the hopper for causing actuation of said switch for energizing the motor only when the pusher has been inserted into the feed passageway, thereby to prevent the inadvertent insertion of a hand or foreign object into said passageway when the food processing tool is being rotated by the energized motor.

15. In a food processor, the improvement as claimed in claim 14, in which said safety interlock includes a projection on said pusher and said hopper has a slot aligned with said projection when said pusher is inserted into said feed passageway for enabling said projection to enter said slot for engaging said means responsive to the presence of the pusher for causing actuation of the switch.

16. In a food processor, the safety interlock improvement as claimed in claim 15, in which said means responsive to the presence of the pusher in said feed passageway is a movable member including spring means for urging said member into a predetermined position with respect to said slot, and said projection on the pusher enters said slot for displacing said member away from said position after the pusher has been inserted into said feed passageway.

17. In a food processor, the safety interlock improvement as claimed in claim 16, in which said movable member is a bowed leaf spring, thereby incorporating said spring means within itself, and said bowed leaf spring becomes displaced from said position by being at least partially straightened by the entry of said projection into said slot.

18. In a food processor, the safety interlock improvement as claimed in claim 16, in which said member is a pivoted arm located within a boss on the hopper, and said spring means urges said pivoted arm adjacent to said slot, and said projection on the pusher enters said slot for swinging said arm away from said slot after the pusher has been inserted into said feed passageway.

19. In a food processor, the safety interlock improvement as claimed in claim 14, in which said switch is also included in said means for preventing energization of the motor unless the cover is in its normal position on the bowl, whereby said switch becomes actuated only when two safety conditions are simultaneously present, namely: (a) the cover is held in its normal position on the bowl and (b) the food pusher is inserted into the food feed passageway in the hopper on the cover.

20. In a food processor having a feed hopper for feeding food articles into a bowl and a pusher insertable into the hopper for pushing food through the hopper and wherein there are means for preventing enertization of the motor unless a cover is held in its normal position on the bowl including an operating cam associated with the cover and a switch caused to be actuated by means of said cam when the cover is in said normal position, the safety interlock improvement comprising: said cam being movably mounted on the cover for occupying an inactive position in which said cam is incapable of causing actuation of said switch and an actuating position in which said cam is capable of causing such actuation, and a movable member operatively associated with said movable cam for moving said cam into said actuating position when said member has been displaced by a food pusher in said hopper.

21. In a food processor, the safety interlock improvement as claimed in claim 20, in which said movable cam is mounted upon said movable member.

22. In a food processor, the safety interlock improvement as claimed in claim 21, in which said movable member is a pivoted arm, and said movable cam is mounted on said arm.

23. In a food processor, the safety interlock improvement as claimed in claim 20, in which said movable member is a push rod engageable with said movable cam for moving said cam into its extended position.

24. In a food processor, the safety interlock improvement as claimed in claim 20, in which said movable member is a pivoted arm, said movable cam is mounted on a pivot, and said pivoted arm engages said pivoted cam for holding said pivoted cam in said actuating position when said arm is swung by said pusher being in said hopper.

25. For use in a food processor of the type including an electric motor in a housing with a drive shaft driven by the motor and extending from the housing and a power switch in the housing for energizing the motor when said switch is actuated, a bowl mountable on said housing for enclosing said drive shaft, with a rotatable tool within said bowl and driveable by said drive shaft, and with means for holding a cover in a normal position on the bowl during operation of the food processor, the improvement which comprises: a removable safety interlock cover for said bowl having a power switch actuator movably mounted on the cover and movable between an inactive position and a switch-actuating position, a food-receiving hopper on said cover having a passageway extending therethrough for feeding food items through the cover into the bowl, said hopper having a lateral opening therein communicating with said passageway, and a food pusher manually insertable into said passageway in said hopper, said switch actuator occupying its inactive position in the absence of the food pusher, and said food pusher having a projection thereon for entering said lateral opening for moving said switch actuator into its switch actuating position for actuating said power switch only when said pusher is in said hopper.

26. For use in a food processor, the safety interlock cover and food pusher as claimed in claim 25, in which said switch actuator is a camming member pivotally mounted on said cover for movement between its inactive position and its switch-actuating position, and said projection on said food pusher urges said camming member into said switch-actuating position when said pusher is in said hopper.

27. In a food processor of the type having a working bowl mountable on a base with tool drive means in the bowl for rotating a food processing tool in the bowl, and wherein an electric motor is located in the base for rotating the tool drive means when the motor is energized, with control means for controlling the operation of the tool drive means, a hopper having a food feed passageway extending through the hopper into the working bowl, a food pusher which is insertable into the food passageway for pushing food items through said passageway, the improvement which comprises: safety interlock means operatively associated with said hopper including means responsive to the presence of the pusher in said feed passageway in the hopper for causing actuation of said control means for operating the tool drive means only when the pusher has been inserted into the feed passageway, thereby to prevent the inadvertent insertion of a hand into said passageway when the food processing tool is being rotated in the bowl by the tool drive means.

28. In a food processor of the type including tool drive means driven by an electric motor drive located in a base with control means for rendering the motor drive inoperative unless said control means is actuated, a bowl mountable on said base for enclosing a rotatable tool within said bowl, said tool being driveable by said tool drive means, a food-receiving hopper extending into the bowl, and a food pusher manually insertable into said hopper for pushing the food items from said hopper into contact with the tool in said bowl, the invention comprising: safety interlock means including first means on said food pusher and second means on said hopper, said first and second means operatively interacting with said control means when said food pusher is at least partially in said hopper for rendering the motor drive operative only when said food pusher is in said hopper, thereby preventing the insertion of a hand through the hopper into the bowl when the tool is being driven by the operative motor drive.

29. In a food processor of the type including tool drive means driven by a motor drive located in a base with control means for rendering the motor drive inoperative unless said control means is actuated, a bowl mountable on said base for enclosing a rotatable tool within said bowl, said tool being driveable by said tool drive means, a removable cover for said bowl, a food-receiving hopper extending through the cover for feeding food items through the cover into contact with a rotating tool in the bowl, and a food pusher manually insertable into said hopper for pushing the food items in said hopper toward the rotating tool, the invention comprising: safety interlock means operatively associated with said food pusher and hopper and cover for actuating said control means for rendering the motor drive operative only when said cover is held in its normal position on said bowl and said bowl is properly positioned on said base and said food pusher is at least partially in said hopper for preventing the insertion of a hand through the hopper into the bowl when the tool is being driven by the operative motor drive.

30. In a food processor of the type having a working bowl mountable on a base with the tool drive means in the bowl for rotating a food processing tool in the bowl, and wherein an electric motor drive is located in the base for rotating the tool drive means when the motor drive is actuated with control means for preventing the rotation of the tool drive means unless said control means is actuated, a hopper having a food feed passageway extending through the hopper into the working bowl, a food pusher which is insertable into the food passageway for pushing food items through said passageway toward a tool in the bowl, the improvement which comprises: safety interlock means including first means on said food pusher and second means outside of said hopper for actuating said control means, said second means being operatively associated with said first means, said second means serving to actuate said control means only when said pusher is at least partially inserted into said feed passageway in the hopper for permitting rotation of the tool drive means only when the pusher has been inserted into the feed passageway, thereby to prevent the inadvertent insertion of a hand into said passageway when the food processing tool is being rotated in the bowl by the tool drive means.

* * * * *